Sept. 29, 1931.  G. W. WATTS  1,825,377
CENTRIFUGAL SEPARATOR
Filed Feb. 18, 1926  2 Sheets-Sheet 2
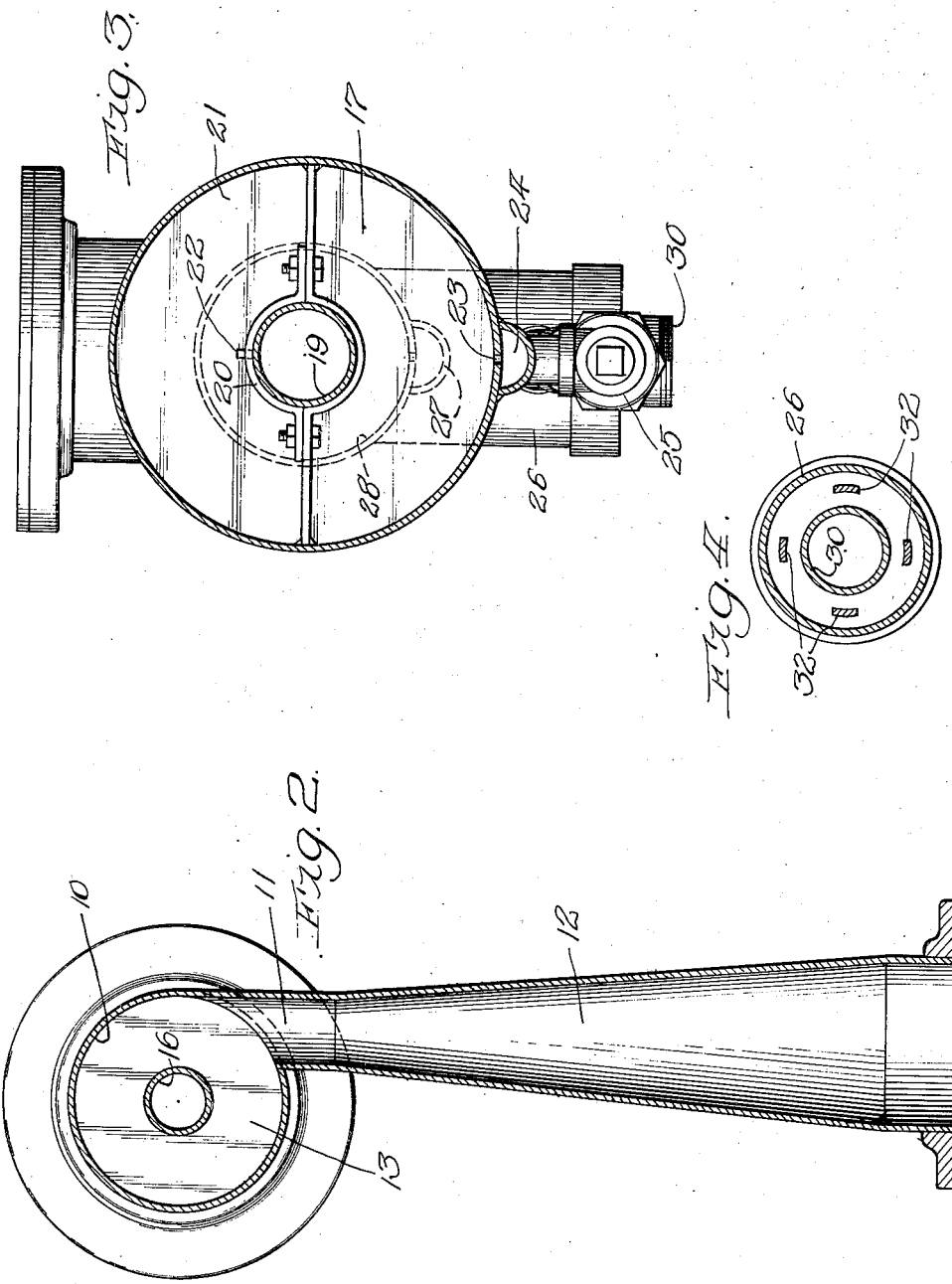

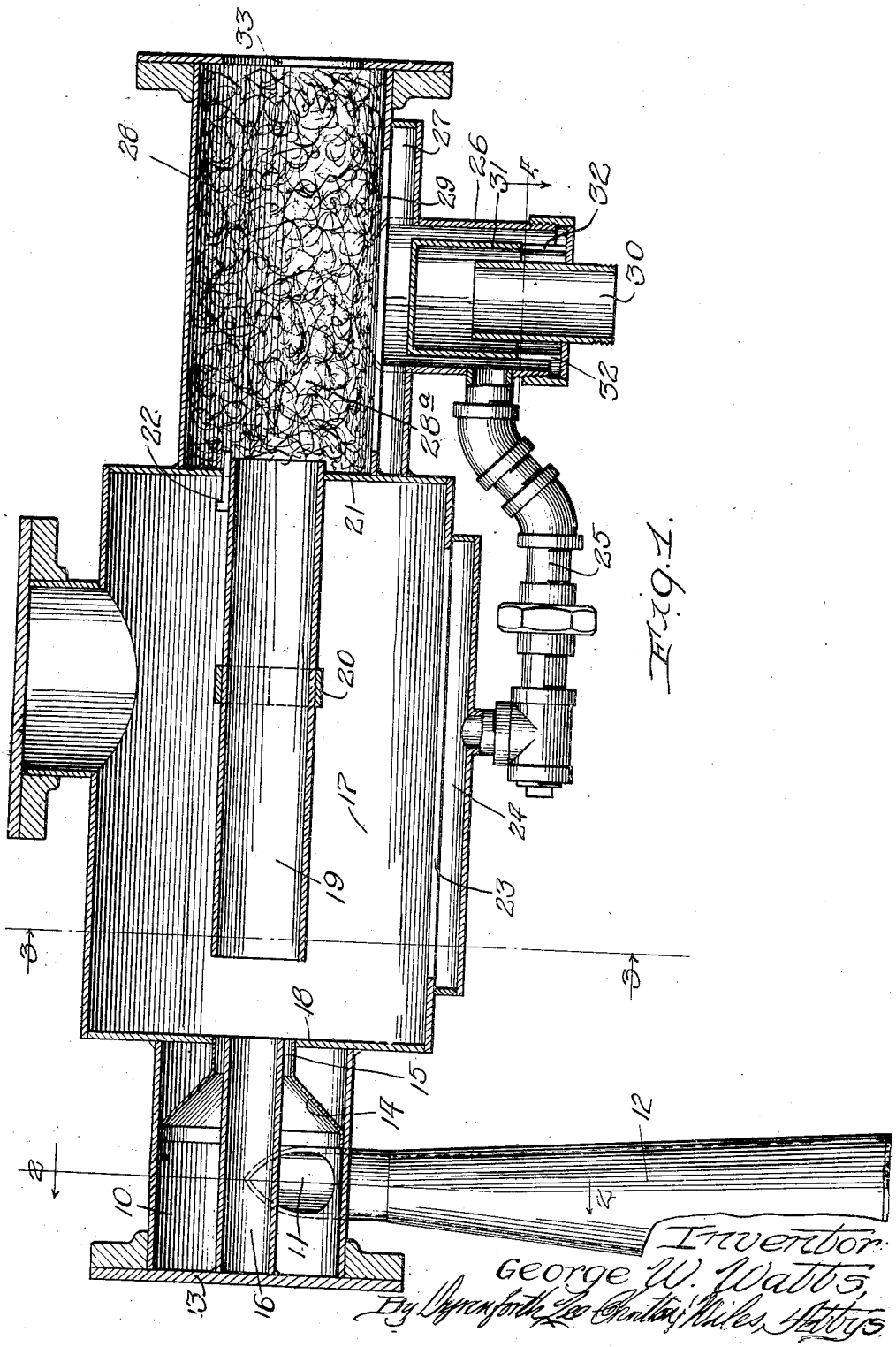

Patented Sept. 29, 1931

1,825,377

UNITED STATES PATENT OFFICE

GEORGE W. WATTS, OF WHITING, INDIANA, ASSIGNOR TO STANDARD OIL COMPANY, OF WHITING, INDIANA, A CORPORATION OF INDIANA

CENTRIFUGAL SEPARATOR

Application filed February 18, 1926. Serial No. 89,097.

This invention relates to centrifugal separators and is particularly adapted to be used for separating liquids from vapor and gases in the refining of petroleum oils. These liquids are often in a finely divided state so that its separation from the vapors at the high velocities required and by ordinary centrifugal methods is very difficult.

The invention is fully described in the following specification and shown in the accompanying drawings, in which:

Figure 1 is a vertical longitudinal section through a centrifugal separator embodying the invention;

Figs. 2 and 3 are vertical sections on the lines 2—2, and 3—3 of Fig. 1; and

Fig. 4 is a horizontal section on the line 4 of Fig. 1.

The embodiment illustrated comprises a centrifugal separator having a chamber 10 which is preferably cylindrical in form. A pipe 11 discharges tangentially into this chamber as shown in Fig. 2, the pipe 11 preferably having a converging cylindrical portion 12 so as to increase the velocity of the gas entering the chamber 10 through this pipe.

One end of the chamber is closed by means of a wall 13 while the other is partially closed by means of a conical end wall 14 which preferably terminates in a straight cylindrical portion 15. To further direct the gas passing through this cylindrical chamber and to further increase its velocity, I have provided a core 16 which is supported by the end wall 13 and which extends axially through the chamber 10 and into the straight cylindrical portion 15.

The cylindrical chamber 10 is placed adjacent to a separating chamber 17 of much greater volume, the cylindrical portion 15 discharging through an end wall 18 of the settling tank.

By this arrangement the mixture of gas or vapor and liquid particles enters the cylindrical chamber 10 at high velocity through the pipe 11 thereby imparting to the mixture within this chamber a high rotational velocity. This whirling mixture escapes to the narrow reduced annular exit between the straight cylindrical portion 15 and the core 16. The effect of thus suddenly decreasing the radius of gyration of this whirling mass is to cause the liquid particles upon emerging into the relatively large separating chamber 17 to be violently thrown away from the central core 16 thereby causing the heavy liquid particles to be carried to the outer walls of the separating chamber 17.

The gas or vapor which is then partially cleaned is withdrawn from the separating chamber 17 by means of the central pipe 19 which is supported near its middle by means of a collar 20 as shown in Fig. 3, the forward end of this pipe passing through the forward wall 21 of the separating chamber. The pipe 19 is adjusted longitudinally by means of a key 22. This should be so adjusted that the gas emerging from the portion 15, will still be swirling as it enters the pipe 19.

The bottom of the separating chamber 17 is slotted at 23 and is provided with a drip pan 24 which is connected through piping 25 with a liquid seal 26. The top of this seal likewise communicates with a similar drip pan 27 which in turn communicates with the interior of the screen chamber 28 by means of a slot or opening 29. The liquid seal 26 is closed at the bottom and has an overflow pipe 30, the height of which substantially fixes the height to which liquid will stand within the liquid seal 26. A closed cylindrical member 31 is inverted and extends over the upper end of the overflow pipe 30 and has a series of openings 32 through which the liquid may pass.

The screen chamber 28 is filled with mineral wool, steel wool, or the like 28ª for separating any entrained liquid remaining in the gas after it leaves the centrifugal separator. The liquid thus trapped is drained out through the slot 29. The greater portion, however, of this liquid may be removed from the gas by the centrifugal separator just described.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. A centrifugal separator of the class described comprising a cylindrical chamber, a pipe leading tangentially thereto, said chamber having a forwardly converging conical end terminating in a reduced opening, an enlarged separating chamber into which said opening delivers, and a tube leading from within said separating chamber substantially in axial alignment with said reduced opening.

2. A centrifugal separator of the class described comprising a cylindrical chamber, a pipe leading tangentially thereto, said chamber having a forwardly converging conical end terminating in a reduced opening, an enlarged separating chamber into which said opening delivers, a tube leading from within said separating chamber substantially in axial alignment with said reduced opening, and means for adjusting the position of said tube with respect to said reduced opening.

3. A centrifugal separator of the class described comprising a cylindrical chamber, a pipe leading tangentially thereto, a reduced opening at one end of said chamber, a separating chamber into which said opening delivers, the walls of said separating chamber widening abruptly at said opening so as to permit the liquid particles to be discharged tangentially on entrance into said separating chamber, a cylindrical outlet from the center of said separating chamber, a screen chamber into which said outlet discharges, a screening material in said screen chamber, and means for withdrawing liquid from said separating and screen chambers.

GEORGE W. WATTS.